Feb. 16, 1943. N. TRBOJEVICH 2,311,006
SPIRAL GEARING AND GEAR TEETH
Filed July 31, 1941   3 Sheets-Sheet 1
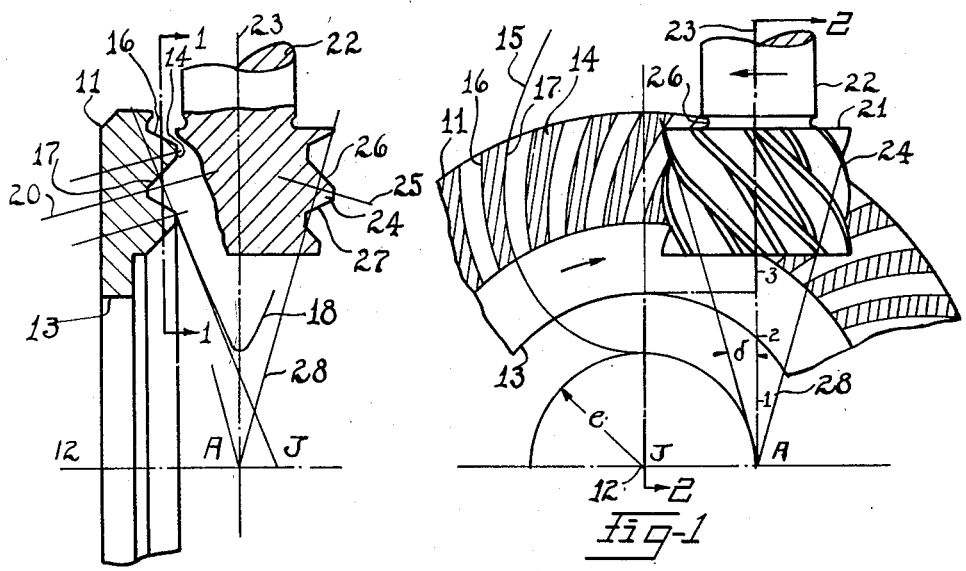
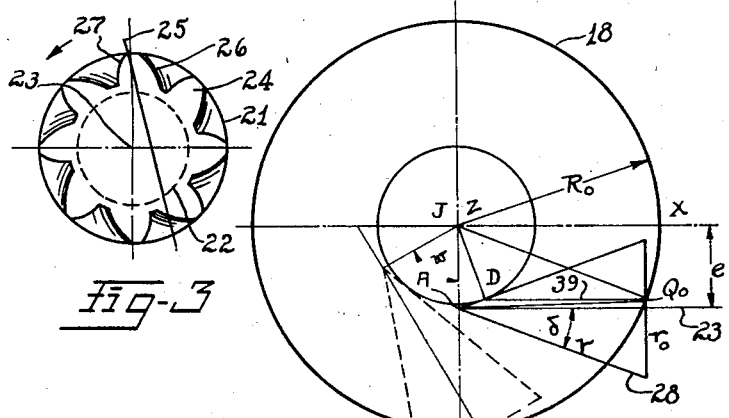
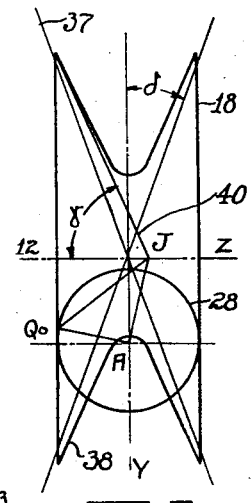
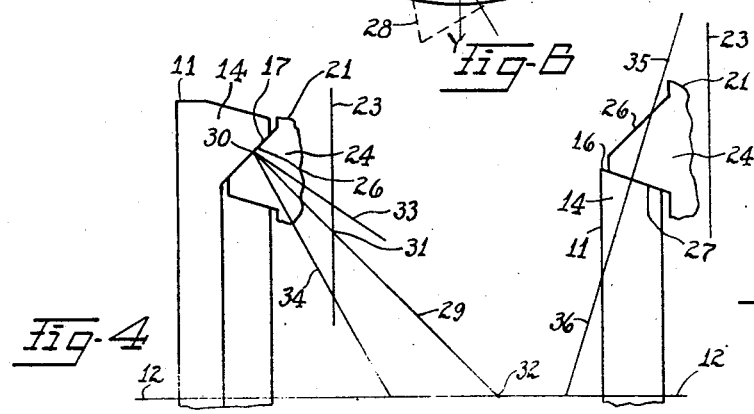
INVENTOR
Nicola Trbojevich

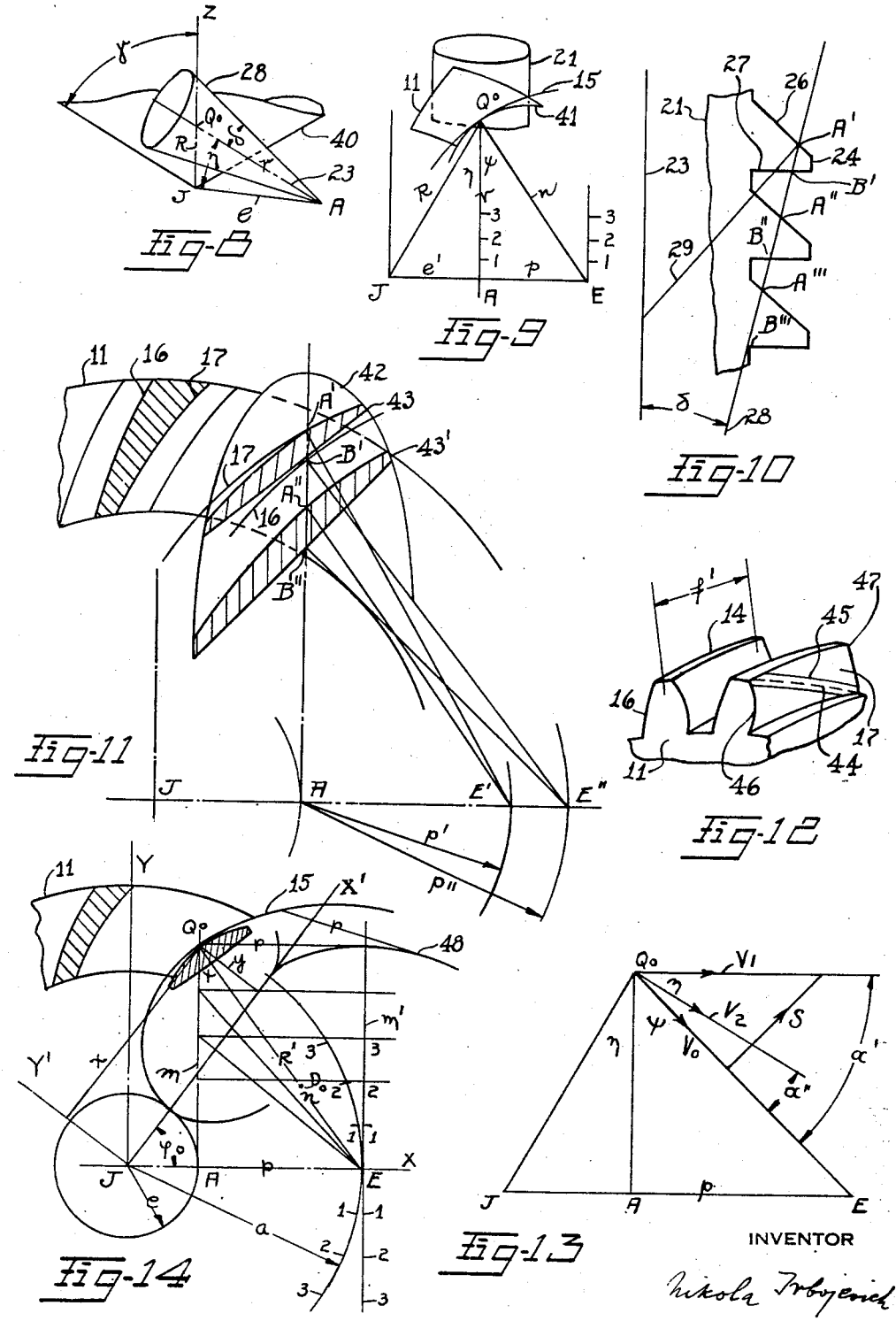

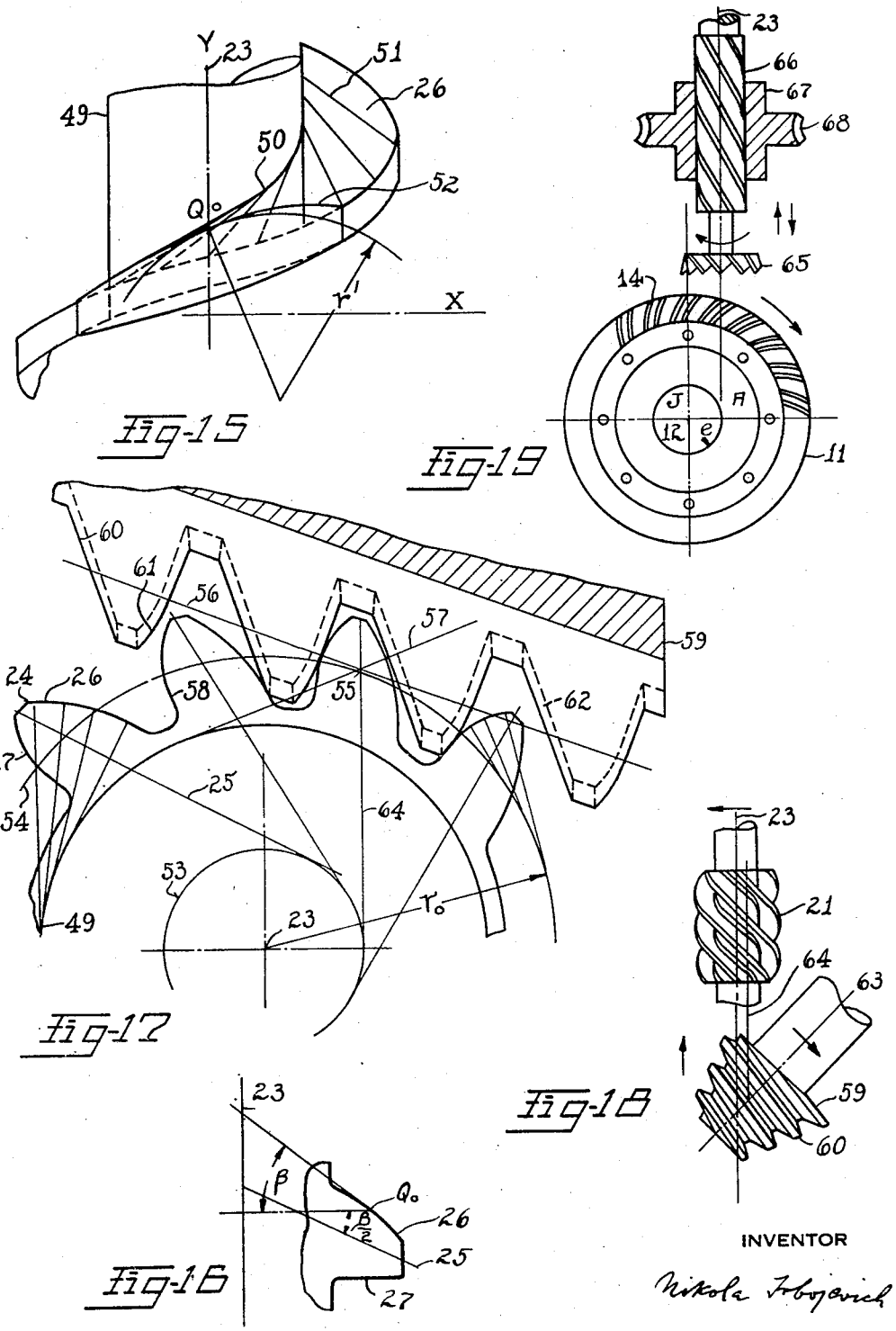

Patented Feb. 16, 1943

2,311,006

UNITED STATES PATENT OFFICE 2,311,006

SPIRAL GEARING AND GEAR TEETH

Nikola Trbojevich, Toledo, Ohio

Application July 31, 1941, Serial No. 404,882

8 Claims. (Cl. 74—466)

The invention relates to a system of gearing comprising a smaller member in the form of a helical pinion and a larger mating member in the form of a wheel having spiral teeth formed upon its face adjacent to the said pinion.

Gearing of this general form is not new in the art, but I discovered a novel type of a helical pinion whereby the interferences between meshing teeth are avoided and the useful contact is correspondingly prolonged.

In particular, the new pinion and the mating wheel are characterized by the fact that the transverse axes of their teeth form an acute angle relative to their respective axes of rotation thus resulting in a non-symmetrical arrangement of the operating tooth flanks in the planes of rotation. In the pinion this feature exemplifies itself in the novel arrangement of teeth in which the said transverse axes are offset from the axis of rotation.

The object is to produce a helical pinion tooth and a mating spiral tooth, the latter having concave and convex sides, in which the radii of curvature are unequal at each side of each tooth, the arrangement being such that a smaller radius in one cooperates with a greater radius in the other and vice versa. It is by this means that the fouling or mutilation in the mating teeth is avoided.

The invention is of a mathematical character and is based upon the calculation of certain hyperboloids, cones, spirals, and their curvatures. Much of this theoretical research rests upon my previous discoveries, as particularly disclosed in my Patent No. 1,647,157 dated November 1, 1927. However, the details pertaining to the asymmetry of the mating teeth are new.

I further discovered new methods and tools for the manufacture of the gear and pinion. The pinion is generated by means of a novel taper hob.

The practical object is to construct a gear drive which may be used in lieu of the present spiral bevel and hypoid gearing, e. g. in automotive axles, and is simpler and cheaper to manufacture and adjust.

In the drawings:

Figure 1 is the plan view of the new pinion and gear showing the gear teeth in cross section, 1—1 plane of Figure 2.

Figure 2 is a sectional side view of Figure 1 taken through the broken plane 2—2.

Figure 3 is the end view of the pinion as viewed from the point A, Figure 1.

Figures 4 and 5 are diagrams explanatory of the principle of the tilted tooth cross axes.

Figures 6, 7, 8, 9, 13, 14, 15 and 16 are geometrical diagrams used in deduction of the Equations 1 to 22 inclusive.

Figures 10 and 11 are two diagrams explanatory of the principle of polar subnormals in the design of tooth spirals.

Figure 12 is a diagrammatic and perspective view of the finished gear teeth.

Figures 17 and 18 are diagrams explanatory of the design and the method of hobbing the new pinion teeth.

Figure 19 is a diagram explanatory of the process of shaping the new gear teeth.

As shown in Figures 1, 2 and 3, the driven member is a ringshaped wheel 11 having an axis of rotation 12, a central bore 13 and a plurality of spiral teeth 14 formed in its plane face. Each of the said teeth is longitudinally curved along the spiral 15 thus being provided with an outwardly facing and convex bearing surface 16 and an inwardly facing and concave surface 17. The spirals 15 are of an ever increasing radius of curvature and are generated from a circle JA in the form of abridged involutes of the circle. The pitch surface is a hyperboloid of revolution 18. The transverse axes 20 of the said spiral teeth are inclined outwardly relative to the axis of rotation 12 and substantially in a direction perpendicular to the said hyperboloid 18. It will be noted that this tipping of the teeth, which is necessary from a theoretical standpoint, does not impair the cross sectional area and the strength of the said teeth.

The pinion 21 is rotatable about its axis 23 by means of an integrally formed shank 22, the said axis being positioned in a plane tangent to the circle JA and also in a plane perpendicular to the axis 12 of the wheel. This particular positioning refers only to the preferred modification of this invention and it is to be noted that my method of tooth construction is applicable to any other positioning of the axes as well. The said pinion consists of a cylindrical body upon which a plurality of equi-spaced helical teeth 24 are formed all having a constant cross contour throughout their lengths. The transverse tooth axes 25 are inclined at an angle relative to the axis of rotation similarly to those of the mating wheel, thus resulting in the lopsided appearance of the said teeth in an end view as shown in Figure 3. The pitch surface is a cone 28 having an apex at the point A.

The principle of the asymmetric formation of teeth in the gear and pinion is diagrammatically shown in Figures 4 and 5. In Figure 4 the asymmetric tooth 14 of the wheel 11 contacts the corresponding pinion tooth 24 with its concave side 17 at the point of contact 30. A normal 29 is drawn at the said point to both cooperating tooth flanks 17 and 26, and its points of intersection 31 with the pinion axis 23 and the point 32 with the wheel axis 12 respectively, are noted. If the influence of the helix and spiral angles is disregarded for the time being, the distance 30—31 of the normal corresponds to the radius of curvature of pinion tooth flank 26 and the distance 30—32 corresponds to the radius of the gear tooth flank 17. The point to note is that as the slope of the flank 17 relative to its axis of rotation 12 is increased, the normal 29 swings upwardly into a new position denoted with the numeral 33 and the radius of curvature of the pinion flank decreases while that of the gear flank simultaneously increases, thus increasing the total divergence between the two mating surfaces rapidly; but if the said slope is diminished, corresponding to a position 34 of the normal 29, the two radii tend to become more equal. For the purpose of this invention a considerable divergence in the curvature of the mating teeth is required to avoid a mutilation of the said teeth and I discovered in this method of tooth formation a simple and effective means for creating such a divergence.

In Figure 5 the conditions prevailing at the convex sides 16 of the gear teeth 14 are diagrammatically shown. In this case the radius of curvature 36 of the gear flank 16 is usually less than the radius 35 of the mating pinion flank 27 and both of the said flanks are convex. The divergence between the mating tooth faces is increased by diminishing the slope the gear tooth face 16 relative to the corresponding axis of rotation 12. It is thus seen that the theory requires that the slope on the concave side of the gear tooth be increased and that on the convex side be decreased relative to the axis of rotation in order to create a divergence with respect to the pinion teeth. These two conditions are compatible with each other and both are satisfied by inclining the tooth axes of both the gear and pinion teeth.

The matter of executing this principle in actual practice resolves itself into a calculation of radii of curvature of the mating teeth which is a matter of considerable mathematical difficulty when the fact is considered that the pitch surfaces and the geometrical forms of the teeth themselves are not as yet known. Due to the lack of space only the briefest mathematical treatment of this subject can and will be given here.

In Figures 6 and 7 the mating pitch surfaces of the pinion and gear respectively are determined. An XYZ coordinate system is first selected, its Z axis coinciding with the gear axis 12, and the pinion axis 23 being placed in the XY plane parallel to the X axis. Tentatively a pitch cone 28 (of the pinion) of a cone angle $\delta$ and having an apex A in the Y axis is selected. This cone is bodily rotated about the axis Z through a variable angle $w$. The geometrical envelope of this family of cones will be the pitch surface of the mating gear.

The equation of the family of cones 28 is of the general form:

$$F(x,y,z,w) = 0 \qquad (1)$$

a function in four variables.

Its first partial differential with respect to $w$ is next found $$\frac{\partial F}{\partial w} = 0 \qquad (2)$$

From the Equations 1 and 2, after eliminating $w$ from both, I obtain the equation of the pitch hyperboloid:

$$\frac{x^2 + y^2}{e^2 \cos^2 \delta} - \frac{z^2}{e^2 \sin^2 \delta} = 1 \qquad (3)$$

I now again partially differentiate the Equation 2 with respect to $w$:

$$\frac{\partial^2 F}{\partial w^2} = 0 \qquad (4)$$

After eliminating $w$ from the Equation 4 by the use of the previous equations, I obtain two equations in $xyz$.

$$\left.\begin{array}{l}\dfrac{x^2}{e^2 \sin^2 \delta \cos^2 \delta} - \dfrac{z^2}{e^2 \sin^4 \delta} \\ y = e \cos^3 \delta\end{array}\right\} \qquad (5)$$

An analysis discloses the following significant facts:

1. The asymptotes 37 of the hyperboloid 18 have an obliquity $\delta$ equal to the cone angle of the generating cone;
2. The cone apex A lies in the focus of the meridian hyperbola 38 of the hyperboloid 18;
3. the gorge radius JD of the hyperboloid 18 is:

$$JD = e \cos \delta \qquad (6)$$

4. the line of contact between the cone 28 and the hyperboloid 18 is a plane curve 39 lying in a plane parallel to the Z axis and specifically it is a hyperbola having the same pair of asymptotes as the meridian hyperbola 38, see the Equation 5. I shall now determine the tangent plane to both pitch surfaces at a pre-selected point $Q_0$ of the contact and analyze the kinematical relations in that plane.

Let $R_0$ and $r_0$ denote the pitch radii of the gear and pinion respectively contacting at the point $Q_0$. After drawing a cone 40 tangent to the hyperboloid all along the pitch circle of a radius $R_0$, I find its apex to lie in the Z axis at the point J and its cone angle to be $\gamma$. Then, the tangent plane is the triangle $Q_0AJ$. The skew arrangement of the two cones 28 and 40 respectively is shown in perspective in Figure 8. In Figure 9 the tangent plane $Q_0AJ$ is developed in the plane of paper. In that diagram the corresponding pitch cone radii of the gear and pinion are denoted with R and r and they include an angle $\eta$ with each other. The relation exists $$\tan \gamma \tan \delta = \cos \eta \qquad (7)$$

for a 90° angle of cooperating axes.

Let now the pitch cone radii R and r rotate about their respective axes J and A in the same direction and at a definite ratio, and let $n$ be the normal at the point tangency $Q_0$ of the two mating longitudinal tooth spirals 15 and 41. The said normal intersects the line JA at a point E which is the center of instantaneous rotation. This latter point may be envisaged as a pitch point of an imaginary internal gear having an axis at J meshing with a pinion having an axis at A in the plane of paper. Thus the spirals 15 and 41 are odontically conjugate to each other very much like two mating tooth curves in a pair of ordinary spur gears.

It can be proved mathematically that if the spiral 41 be an Archimedean spiral, the curve 15 will be an abridged involute having an abridgment numerically equal to the polar subnormal AE of the first spiral. I proved that point in certain publications of mine some years ago. In Figures 10 and 11, I shall show that the novel pinion possesses not one but two systems of Archimedean spirals in its tooth surfaces, one having a longer and the other a shorter polar subnormal. From above data I determine the equations of the two systems (one for each side of the teeth) of the abridged involutes in the gear teeth and calculate their radii of curvature.

In Figure 10 the axial section of the new pinion is intersected by means of the pitch cone generator 28 thus furnishing two sets of equispaced points of intersection with the teeth of the said pinion. The outwardly facing tooth flanks 26 are intersected at the points A'A''A''' of a shorter pitch A'A'' etc., and the inwardly facing tooth flanks are intersected at the points B'B''B''' of a longer pitch B'B'' etc. Thus there are two sets of constant pitch spirals lying in the surface of the pitch cone 28 when this process of intersection is completed all around the circumference of the pinion. In plane development of the cone 28 these curves will appear as Archimedean spirals having a polar subnormal $p$ having a value in the first series:

$$p' = \frac{n_1 A'A''}{2\pi \sin \delta} \quad (8)$$

where $n_1$ is the number of teeth in the pinion.

A similar expression is found for the value of the polar subnormal of the other series by merely substituting the pitch B'B'' for the pitch A'A'' in the Equation 8.

In Fig. 11 (which is a projection of Figure 10) the pinion 21 is intersected by a plane tangent to the pitch cone 28 and this plane is laid in the plane of paper. The outside circumference of the pinion as intersected by the said plane gives the ellipse 42 and the points of convergence of the normals drawn to each of the two series of Archimedean spirals are denoted with E' and E'' respectively thus determining the two polar subnormals $p'$ and $p''$ respectively. The intersections of the said tangent plane with the teeth of the pinion are the crescent shaped areas 43 and 43' forming a series of segments of an ever increasing width and thickness and most important of all, of shorter radii of curvature on their sides facing outwardly (the series A' A'' etc.) and of longer radii on their sides facing inwardly. As a result of this, the gear tooth spirals form two series of abridged involutes 16 and 17 respectively, both series having the same modified base radius JA but having different amounts of abridgment $p''$ and $p'$ respectively.

In Figure 12 the completed teeth 14 of the novel gear 11 are shown diagrammatically and in perspective. The pitch line 44 is the line of intersection of the tooth 14 with the pitch hyperboloid 18, Figures 6 and 7, and the area 45 adjacent to the said pitch line is mathematically identical with the tooth surface of the hyperboloidal gear shown in my Patent No. 1,647,157, Figures 2 and 3. Inasmuch as the pitch line 44 diagonally crosses the teeth 14, it follows that the said teeth will have long dedenda 46 at their ends nearest to the center and long addenda 47 at the outer circumference of the gear. This peculiarity limits the practical use of this type of gearing both as to the available width of face of $f'$ of the teeth as well as to the practicable ratios of transmission. The latter should be greater than about four to one, according to my calculations.

In Figure 13 the relation between the circumferential velocities $V_1$ and $V_2$ of the pinion and gear respectively is shown. From this relation the conjugate pitch radii are readily calculable as well as the sliding velocity S. First, the sliding S:

$$S^2 = V_1^2 + V_2^2 - 2V_1V_2 \cos \eta \quad (9)$$

Let now $w_1$ and $w_2$ be the angular velocities of the pinion and gear, $$V_1 = v_0 w_1 \quad (10)$$
$$V_2 = R_0 w_2 \quad (11)$$
$$\frac{w_1}{w_2} = \frac{n_2}{n_1} = Q \quad (12)$$

where $n_1$ and $n_2$ are the corresponding numbers of teeth in pinion and gear and Q is the ratio of transmission. Let further $V_0$ denote the normal velocity (in the direction of the common normal $Q_0E$) of both pinion and gear. Then, $$V_1 \cos \alpha' = V_2 \cos \alpha'' = V_0 \quad (13)$$

where $\alpha'$ and $\alpha''$ are the helix or spiral angles of the pinion and gear. By a substitution from the Equations 10, 11 and 12 I obtain:

$$Q r_0 \cos \alpha' = R_0 \cos \alpha'' \quad (14)$$

from which $r_0$ is determined. The relations also exist $$\alpha'' = \alpha - \eta \quad (15)$$

and $$\alpha' = \frac{\pi}{2} - \psi \quad (16)$$

where $$\tan \psi = \frac{p}{r} \quad (17)$$

$p$ being the polar subnormal of the Archimedean spirals and $r$ the pitch cone radius of the pinion.

In Figure 14 the method of deriving the equation and the radius of curvature R' at the point of contact $Q_0$ of the gear spiral 15 is shown. If an auxiliary coordinate system X'Y' is selected in addition to the original XY system such that $$a\varphi_0 = Q_0 A \quad (18)$$

where $Q_0 A$ is equal to the length of the rack generator $m$, the equations of the spiral become greatly simplified and assume the form:

$$\begin{aligned} x &= e \cos \varphi + a\varphi \sin \varphi \\ y &= e \sin \varphi - a\varphi \cos \varphi \end{aligned} \quad (19)$$

in the X'Y' coordinate system. The mechanical generation of this spiral may be accomplished in two different ways, viz: First, I roll the line $m'$ over the stationary circle JE and connect the line $m$ rigidly thereto; then, any point of line $m$ will describe an abridged involute 15 defined by the pair of Equations 19. Secondly, I first construct the involute 48 from the circle JE, draw a series of tangents thereto and scale off inwardly the distance $p$ upon each such tangent. The locus will again be the same curve 15. The radius of curvature of the spiral 15 at the point $Q_0$ is equal to R' or the distance $Q_0D_0$. Its exact value is calculable from the Equations 19 by a standard procedure known from differential calculus. I have found that value to be:

$$R' = \frac{n}{1 + \frac{a}{n} \sin \psi} \qquad (20)$$

where $n$ is the length of the normal $Q_0E$ and $a$ and $\psi$ have the values as indicated in the diagram.

Having thus found the curvature of the gear tooth spirals I proceed to my next and last object in this analysis which is, to find the curvature of the pinion tooth in any particular section thereof. From this I shall determine first the pressure angles of the pinion teeth at their opposite sides and second, the angle to which the said teeth must be tipped relative to the axis of rotation. The basic idea is that at the hollow sides of gear spirals the radius of curvature of the pinion tooth in any plane section whatever must be less than the radius of the gear tooth, as already stated.

In Figure 15 the method of calculating the radius of curvature $r'$ of the outwardly facing pinion tooth flank 26 is shown. The calculation is rather lengthy and consists of the following steps:

I first assume a base cylinder 49 coaxial with the pinion and scribe upon it a helix 50 of the same lead as the pinion. Next I draw a series of tangents 51 to the said helix thus obtaining the tooth surface 26 of the pinion which surface is an involute helicoid. I now intersect the said surface at its point $Q_0$ by means of a plane parallel to the axis 23 thus obtaining the equations of the curve of intersection 52 in the XY coordinate system. These equations I differentiate twice to obtain the first and second derivatives (usually in a parametric form) from which the radius of curvature is obtained by using the same formula as before, in the case of the gear tooth spirals. After performing all these calculations I have derived the formula:

$$r' = \frac{r_0}{\tan \beta \cos^2 \psi} \qquad (21)$$

where $\beta$ is the normal pressure angle of the pinion tooth on its side facing outwardly of the gear, see Figure 16. In typical examples of this kind this angle will be found to lie between 35 and 40 degrees, as referred to the axis of rotation. The said angle $\beta$ is determined from the inequality $r' < R'$ from which:

$$\tan \beta > \frac{r_0}{R' \cos^2 \psi} \quad Q.\ E.\ D. \qquad (22)$$

This ends the analysis of the conjugate dimensions in the pinion and gear including their radii of curvature. Once knowing the normal pressure angle $\beta$ on the outwardly facing flank 26 of the pinion tooth (which side I call the "coasting" side), I assume for the opposite flank 27 (see Figure 16) a normal pressure angle as small as practicable, say equal to zero, as the "driving" side of the pinion. The tooth cross axis 25 will then bisect these two angles.

In Figures 17 and 18 the methods of designing and generating the new pinion are shown. The cross axes 25 of the pinion teeth 24 are all offset from the axis of rotation 23 at the same distance thus making them all tangent to the circle 53, and equispaced. The pitch circle 54 (which also serves as the base circle for the driving flank 27) is next drawn, thus determining the pitch point 55. The first line of action 56 (for the driving side) is drawn tangent to the pitch circle 55 and the second line of action 57 (for the coasting side 26) is drawn symmetrically of the first line. This determines the base circle 49 of the coasting side. The tooth flank 26 is an involute from top to bottom drawn from the base circle 49 while the opposite flank 27 is partly an involute, at its addendum, and partly a radial line 58 at its dedendum.

The taper hob 59 has a pitch line 56 inclined relative to its axis of rotation and a plurality of equispaced rack teeth 60 having pressure angles symmetrically disposed relative to the axis of rotation of the hob. The contours of the said cutting teeth 60 are straight lines in order to generate involute curves in the pinion in all portions thereof with the exception of the portion 61 which is a curve so generated that it will be conjugate with the radial flank 58 of the pinion tooth and generate the same. The hob teeth are relieved in the same manner as any ordinary hobs are i. e. in the direction perpendicular to the hob axis thus producing the relieved contours 62. The cutting efficiency of such a hob is equal at both sides of the pinion teeth in spite of the asymmetrical shape of the latter and the contour of the hob including the spacings and thicknesses of teeth remains unchanged after repeated sharpenings.

In Figure 18 the method of generating the new pinions by means of the new taper hob 59 in an ordinary hobbing machine is shown. The hob is usually single threaded, of the same hand as the pinion 21 to be cut and its axis 63 is tilted in a plane parallel to the axis of the pinion in the same manner as when cutting ordinary helical pinions. The machine is also geared up in the conventional manner and the cutting of the pinion proceeds in all respects similarly to the conventional method with the exception of the fact that the point of tangency between the hob and the pinion to be cut lies now in an offset plane 64 instead of the conventional centrally located plane 23.

In Figure 19 the method of generating the new spiral gear 11 is diagrammatically illustrated. A helical gear shaping machine is used which is provided with the so-called "face cutting" attachment which means that the axis 23 of the cutter spindle and the axis 12 of the work spindle are disposed at an angle relatively to each other, usually at a right angle. The axes 23 and 12 are further so disposed as to be at distance $e$, equal to the offset of the drive, from each other as measured in a projection perpendicular to the plane of the gear. The shaping cutter 65 is a replica of the pinion shown in Figure 17 and has helical teeth of the same hand and lead as the pinion. The cutter is reciprocated in a helical path by means of the affixed helical guide screw 66 and a corresponding nut 67, the latter being rotatable by means of the worm gear 68. In this manner all the teeth 14 of the gear are generated in a continuous process and on their both sides.

It was suggested prior to this invention that the gear members of this general type could be produced by means of a hobbing process. I have found that impossible to do because of the very unsatisfactory cutting action of the hob when so employed. The sliding velocity S, see Figure 13, in this type of gearing is relatively small in comparison with the normal or rolling velocity $V_0$ for which reason the hob would mostly roll together with the work but would cut very unsatisfactorily if at all. Therefore, I generate the gear member by means of the above described shaping process.

What I claim as new is:

1. A mating pair of gears consisting of a rotatable cylindrical pinion having a plurality of helical teeth of a constant cross section throughout their length, and a rotatable spiral gear having a plurality of longitudinally curved teeth of ever increasing radii of curvature and a variable cross section throughout their lengths, in which the teeth of both members have transverse axes which are inclined at predetermined acute angles relative to the corresponding axes of rotation for the purpose of increasing their relative divergence from each other.

2. A mating pair of gears consisting of a rotatable cylindrical pinion having a plurality of helical teeth of a constant cross section, and a rotatable wheel having a plurality of spiral teeth of a variable cross section throughout their lengths, in which the pinion contacts the said wheel in a line offset from the axis of rotation and diagonally crossing the teeth of the said wheel, and in which the teeth in both members are asymmetrically formed relative to their respective planes of rotation, but are substantially perpendicular to the said line of contact.

3. A crown wheel having a plurality of equispaced teeth disposed in a plane, in which the said teeth are longitudinally formed along spirals having ever increasing radii of curvature, in which the said teeth have concave and convex contact surfaces formed at their opposite sides and in which the slope of inclination of the concave surfaces is by a definite amount greater than the slope of the convex surfaces, relative to the said plane.

4. A crown gear having a rotatable disk shaped body and a plurality of equispaced longitudinally curved teeth formed in the face of the said disk in which the transverse axes of the said teeth are outwardly divergent relatively to the axis of rotation of the gear in such a manner that each of the said axes is substantially perpendicular to a hyperboloid of revolution coaxial with the said gear and having a gorge radius on the same side of the gear upon which the said spiral teeth are formed.

5. A crown gear having a plurality of spiral teeth of a constant depth and a variable cross contour throughout their lengths formed in its plane of rotation at one side of the said gear, in which the said teeth are asymmetrically shaped and are longitudinally curved to conform with a series of modified involutes having a greater degree of modification at their one side and with another series having a less degree of modification at the other side.

6. A crown gear having a plurality of spiral teeth of a constant depth and a variable cross contour and curvature throughout their lengths disposed about an axis in a plane in which each of the said teeth has a longitudinally disposed concave and convex surface of contact and in which the said surfaces are equispaced in a line offset from the said axis and are curved relatively to the said line at different radii of curvature at their concave and convex sides in order to simultaneously contact a rack element of a constant pitch having asymmetrical teeth.

7. A pair of mating gears comprising a larger or wheel member having a plurality of curved teeth of a variable cross contour and curvature throughout their lengths and a smaller or pinion member having a plurality of helical teeth of a constant cross contour and curvature throughout their lengths in which further the teeth in both members are asymmetrical at their opposite sides and specifically are abridged involutes of two different degrees of modification in the wheel member and two involute helicoids developed from two different base helixes in the pinion.

8. A pair of mating gears comprising a spiral gear having a plurality of teeth of a variable cross section throughout their lengths and asymmetrically formed at their opposite sides and a cylindrical pinion having a plurality of helical teeth of a constant cross section throughout their lengths and also asymmetrically formed at the opposite sides thereof, in which the tooth cross contours in both members are convex at all points and in which the cross contours of the gear teeth are conjugate to a lamina formed from the pinion member when the said lamina is rotated in a timed relation in plane transverse of the said gear teeth.

NIKOLA TRBOJEVICH.